US005272227A

United States Patent [19]

Munk

[11] Patent Number: 5,272,227
[45] Date of Patent: Dec. 21, 1993

[54] ADDUCTS OF HYDROXYL GROUP CONTAINING EPOXY RESINS AND ISOCYANATES AND USE THEREOF

[75] Inventor: Kurt Munk, Grenzach, Fed. Rep. of Germany

[73] Assignee: Ciba-Geigy Corporation, Ardsley, N.Y.

[21] Appl. No.: 747,594

[22] Filed: Aug. 20, 1991

[30] Foreign Application Priority Data

Aug. 27, 1990 [CH] Switzerland .................. 2766/90

[51] Int. Cl.⁵ .............................................. C08L 63/10
[52] U.S. Cl. ...................................... 525/528; 525/28; 523/402; 528/59; 528/60; 528/67; 528/73
[58] Field of Search ............... 525/528, 28; 523/402; 524/589; 528/59, 60, 87, 73

[56] References Cited

U.S. PATENT DOCUMENTS

| | | | |
|---|---|---|---|
| 2,977,370 | 3/1961 | Oken | 260/307 |
| 3,108,100 | 10/1963 | Tate et al. | 260/248 |
| 3,424,719 | 1/1969 | Masters | 528/73 |
| 3,494,888 | 2/1970 | McElroy | 260/47 |
| 3,585,227 | 6/1971 | Dreyfuss | 260/440 |
| 4,085,161 | 4/1978 | Sekmakas et al. | 525/528 |
| 4,134,866 | 1/9179 | Tominaga | 525/528 |
| 4,401,499 | 8/1983 | Kaneko et al. | 156/307.3 |
| 4,562,227 | 12/1985 | Rogler et al. | 524/786 |
| 4,564,651 | 1/1986 | Markert et al. | 524/589 |
| 4,728,676 | 3/1988 | Müller et al. | 521/107 |
| 4,728,676 | 11/1988 | Müller et al. | 521/104 |
| 4,855,368 | 8/1989 | Tufts et al. | 525/528 |
| 4,906,722 | 3/1990 | Eldin et al. | 528/49 |

FOREIGN PATENT DOCUMENTS 3542569 12/1984 Fed. Rep. of Germany .

OTHER PUBLICATIONS

Patent Abstract of Japan 58098325.
International Polymer Science and Technology, vol. 13, (1986) No. 8.
WPI Acc. No: 86-028492/05.

*Primary Examiner*—John Kight, III
*Assistant Examiner*—Richard Lee Jones
*Attorney, Agent, or Firm*—William A. Teoli, Jr.; Villamizar, JoAnn

[57] ABSTRACT

Adducts obtainable by reacting (a) an epoxy resin having a OH value of 0.02–1.5 equivalents/kg and (b) a di- or polyisocyanate, said reaction being carried out with exclusion of moisture and essentially without a catalyst, can subsequently be converted by reaction with an inhibitor (c), preferably an acrylate, into storage-stable adducts.

The adducts can be cured in the presence of a latent hardener conventionally used for EP/IC resin systems in a weakly exothermic reaction to give crosslinked products which have excellent properties.

15 Claims, No Drawings

ADDUCTS OF HYDROXYL GROUP CONTAINING EPOXY RESINS AND ISOCYANATES AND USE THEREOF

The present invention relates to adducts obtainable by reaction of specific hydroxyl group containing epoxy resins with isocyanates, excluding moisture and essentially without a catalyst, to the stabilisation thereof to storage-stable adducts by reaction with specific inhibitors, to curable mixtures containing said adducts, and to the crosslinked products obtainable by heat curing said mixtures.

Heat curable mixtures of epoxy resins and di- or polyisocyanates (EP/IC resins) are known in the art. The hardeners used for such mixtures, as disclosed inter alia in EP-A 130 454 and EP-A 129 799, are tertiary amines or imidazoles, especially addition complexes of boron trihalides and tertiary amines and imidazoles or onium salts of tertiary amines and imidazoles.

In DE-A 3 600 764 it is taught to use tertiary or quaternary ammonium salts of alkylating or acid esters of organic phosphonic acids or phosphoric acid as hardeners for heat curable mixtures of epoxy resins and polyisocyanates. Further, specific cyanoacetamides are used in EP-A 319 473 for curing mixtures of epoxy resins and polyisocyanates.

The thermal crosslinking of these prior art EP/IC resin systems is intensely exothermic, so that much heat is generated. This in turn leads to high temperatures during the production of moulded articles. These exothermic peaks damage the moulding composition, increase shrinkage on cooling, and cause stresses and cracks in the moulded article.

It has now been found that these problems do not arise by using in place of a mixture of epoxy resins and isocyanates specific adducts of these compounds.

Specifically, the invention relates to adducts obtainable by reacting (a) an epoxy resin having a OH value of 0.02–1.5 equivalents/kg and (b) a di- or polyisocyanate, said reaction being carried out with exclusion of moisture and essentially without a catalyst.

If desired, the adducts so obtained can subsequently be converted by reaction with an inhibitor (c) into storage-stable adducts, which are also an object of the invention.

The novel adducts can be thermally cured with the catalytic latent hardeners by heat conventionally used for EP/IC resin systems in a weakly exothermic reaction to give crosslinked products which have excellent thermal, mechanical and electrical properties.

Further objects of the invention are accordingly also curable mixtures comprising a novel adduct and (d) a latent catalyst as well as the crosslinked products obtainable therefrom by heat curing.

Two-step hardening methods for EP/IC resin systems have previously been described in the literature. However, these methods are carried out in the presence of a catalyst in the first step and proceed via intermediates which differ from the adducts of this invention.

Thus DE-A 3 600 764 cited above discloses that the cure of the EP/IC resin system with the curing catalysts used in this publication can be discontinued at any time by cooling and resumed at a later time. In this procedure, the reaction can conveniently be discontinued at a time when the mixture obtained after cooling is in a "B-stage", i.e. in a state which is solid, yet still fusible, at room temperature.

According to EP-A 272 563, an EP/IC resin system is reacted in the presence of a tertiary amine as catalyst to an intermediate, and the reaction is discontinued at a maximum conversion of 65% of the isocyanate groups present in the starting mixture by adding specific alkylating agents which act as anti-catalysts.

Both the intermediate obtained in EP-A 272 563 as well as the "B-stage" of DE-A 3 600 764 contain oxazolidinone and isocyanurate groups, which are formed by reaction of the epoxy groups of the epoxy resin with the isocyanate groups of the polyisocyanate in the presence of a catalyst. Very pure epoxy resins, i.e. substantially free from hydroxyl groups, must be used to avoid premature gelation (q.v. Example 6 of DE-A 3 600 764).

In contradistinction to these prior art reactions, the novel adducts are prepared by reacting epoxy resins and isocyanates essentially without a catalyst, i.e. no catalyst is specially added to the reaction mixture during the preparation of the adducts. This does not, however, exclude small amounts of a catalyst which may be present in the educts, especially in the isocyanate component (b). Those skilled in the art will know that commercially available isocyanates, which are partially modified, will possibly have been prepared using a catalyst, and the residues of such a catalyst will remain in modified isocyanate product. In the preparation of the novel adducts, the epoxy groups of the epoxy resin are not attacked and the epoxy content of the reaction mixture therefore remains unchanged. The reaction is carried out by reacting the hydroxyl groups of the epoxy resin which, as claimed, must have a specific content of hydroxyl groups, with the isocyanate groups of the isocyanate. It is presumed that initially a urethane is formed and then an allophanate, as illustrated in the following reaction scheme:

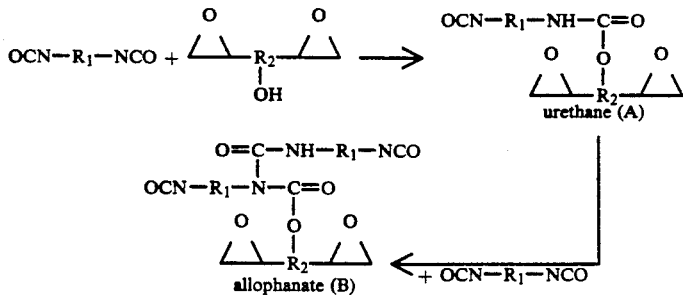

As mentioned as the outset, the novel adducts can be stabilised by reaction with an inhibitor and converted into storage-stable adducts.

Preferred suitable inhibitors are compounds which can be reached in a Michael-type 1,4-addition with nucleophiles. Suitable inhibitors are typically cinnamates, methacrylates and, preferably, acrylates. Particularly preferred inhibitors are polyacrylates of dipentaerythritol, such as dipentaerythritol hexacrylate or a mixture of dipentaerythritol hexacrylate and dipentaerythritol monohydroxypentacrylate. Such products are commercially available, for example as ARONIX ® M-400, sold by Toagosei Chem. Ind., Japan. It is presumed that the efficacy of the inhibitor rests on a Michael-type reaction of the NH group of the allophanate B and/or the urethane A with the acrylate groups.

The amount of inhibitor is preferably so chosen that about 1 to 2, preferably about 1 to 1.2, cinnamate, methacrylate or acrylate groups are present per OH group of the epoxy resin or per NH group of the allophanate B and/or urethane A.

The adducts reacted with the inhibitor (c) have an excellent pot life. For example, after 6 weeks at 50° C. the increase in viscosity is only c. 15%. The novel curable mixtures which contain the storage-stable adducts and a latent catalyst have a satisfactorily long service life and, depending on the catalyst, can be readily stored for 8 days or even longer at room temperature.

On account of the weak exothermic reaction during curing, the reactive casting mixtures can be easily processed in closed systems (pressure gelation method).

Preferred adducts of this invention are those in the preparation of which the amounts of components (a) and (b) are so chosen that 0.1–40, preferably 0.2–10, isocyanate groups of the di- or polyisocyanate (b) are present per epoxy group of the epoxy resin (a).

The reaction is preferably carried out at 50°–150° C. for 5–15 hours, most preferably at 80°–120° C. for 8–12 hours.

In principle, any known epoxy resin having the claimed OH value may be used as epoxy resin (a).

Illustrative examples of epoxy resins:

I) Polyglycidyl and poly(β-methylglycidyl) esters which are obtainable by reacting a compound containing at least two carboxyl groups in the molecule and epichlorohydrin or glycerol dichlorohydrin or β-methyl epichlorohydrin. The reaction is conveniently carried out in the presence of a base.

Compounds containing at least two carboxyl groups in the molecule may suitably be aliphatic polycarboxylic acids. Exemplary of these polycarboxylic acids are glutaric acid, adipic acid, pimelic acid, suberic acid, azelaic acid, sebacic acid or dimerised or trimerised linoleic acid.

Cycloaliphatische polycarboxylic acids may also be used, for example tetrahydrophthalic acid, 4-methyltetrahydrophthalic acid, hexahydrophthalic acid or 4-methylhexahydrophthalic acid.

Aromatic polycarboxylic acids may also be used, for example phthalic acid, isophthalic acid or terephthalic acid. II) Polyglycidyl or poly(β-methylglycidyl) ethers which are obtainable by reacting a compound containing at least two free alcoholic hydroxyl groups and/or phenolic hydroxyl groups in the molecule with epichlorohydrin or β-methylepichlorohydrin, under alkaline conditions or in the presence of an acid catalyst and subsequent treatment with an alkali.

Ethers of this type are derived from, for example, acyclic alcohols such as ethylene glycol, diethylene glycol and higher poly(oxyethylene) glycols, 1,2-propanediol, or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylolpropane, bis(trimethylol)propane, pentaerythritol, sorbitol, as well as from polyepichlorohydrins.

They are also derived, for example, from alcohols such as 1,4-cyclohexanedimethanol, bis-(4-hydroxycyclohexyl)methane or 2,2-bis(4-hydroxycyclohexyl)propane, or they contain aromatic nuclei, such as N,N-bis(2-hydroxyethyl)aniline or p,p'-bis(2-hydroxyethylamino)diphenylmethane.

The epoxy compounds may also be derived from mononuclear phenols such as resorcinol or hydroquinone, or they are based on polynuclear phenols such as bis(4-hydroxyphenyl)methane, 2,2-bis(4-hydroxyphenyl)propane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl)propane, 2,2-bis(3,5-dibromo-4-hydroxyphenyl)propane, as well as novolaks obtainable by condensation of aldehydes, such as formaldehyde, acetaldehyde, chloral or furfuraldehyde, with phenols, such as phenol, or with phenols which are substituted in the nucleus by chlorine atoms or $C_1$–$C_9$alkyl groups, for example 4-chlorophenol, 2-methylphenol or 4-tert-butylphenol, or by condensation with bisphenols, as described above.

III) Poly(N-glycidyl) compounds are obtainable, for example, by dehydrochlorination of the reaction products of epichlorohydrin with amines which contain at least two amino hydrogen atoms. These amines are typically aniline, n-butylamine, bis(4-aminophenyl)methane, m-xylylenediamine or bis(4-methylaminophenyl)methane.

The poly(N-glycidyl) compounds also include triglycidyl isocyanurate, N,N'-diglycidyl derivatives of cycloalkylene ureas such as ethyleneurea or 1,3-propyleneurea and diglycidyl derivatives of hydantoins, such as 5,5-dimethylhydantion.

IV) Poly(S-glycidyl) compounds are typically bis-S-glycidyl derivatives which are derived from dithiols such as 1,2-ethanedithiol or bis(4-mercaptomethylphenyl) ether.

V) Cycloaliphatic epoxy resins such as bis(2,3-epoxycyclopentyl) ether, 2,3-epoxycyclopentylglycidyl ether, 1,2-bis(2,3-epoxycyclopentyloxy) ethane or 3,4-epoxycyclohexylmethyl-3',4'-epoxycyclohexanecarboxylate.

It is also possible, however, to use epoxy resins in which the 1,2-epoxy groups are attached to different hetero atoms or functional groups. These compounds comprise, for example, the N,N,O-triglycidyl derivative of 4-aminophenol, the glycidyl ether/glycidyl ester of salicylic acid, N-glycidyl-N'-(2-glycidyloxypropyl)-5,5-dimethylhydantoin or 2-glycidyloxy-1,3-bis(5,5-dimethyl-1-glycidylhydantoin-3-yl)propane.

It is preferred to use epoxy resins having an epoxy value of 2 to 10 eqivalents/kg. Aliphatic, cycloaliphatic or aromatic epoxy resins are preferably used.

Particularly preferred epoxy resins are polyglycidyl ethers of bisphenols, typically of 2,2-bis(4-hydroxyphenyl)propane (bisphenol A) or bis(4-hydroxyphenyl)methane (bisphenol F), of novolaks which are obtained by reaction of formaldehyde with a phenol, or of the aliphatic diols referred to above, preferably of 1,4-butanediol.

Aromatic epoxy resins are most preferred, especially those derived from bisphenol A.

Preferred suitable di- or polyisocyanates (b) for the preparation of the novel adducts are aliphatic, cycloaliphatic or aromatic isocyanates.

It is preferred to use mixtures of 4,4'- and 2,4'-diisocyanatodiphenylmethane isomers, polyol-modified polyisocyanates and mixtures of liquid polyisocyanates with high molecular weight polyisocyanates or carbodiimide polyisocyanates.

Further eligible polyisocyanates include hexane-1,6-diisocyanate, cyclohexane-1,3-diisocyanate and isomers, 4,4'-diisocyanatodicyclohexylmethane, 3-isocyanatomethyl-2,5,5-trimethylcyclohexylisocyanate, 1,3-dimethylbenzene-$\omega,\omega'$-diisocyanate and isomers, 1-methylbenzene-2,4-diisocyanate and isomers, naphthalene-1,4-diisocyanate, diphenyl ether 4,4'-diisocyanate and isomers, diphenylsulfone-4,4'-diisocyanate and isomers, as well as tri- or polyfunctional isocyanates, such as 3,3',4,4'-diphenylmethanetetraisocyanate. It is also possible to use isocyanates which are masked in conventional manner with phenol or cresol. Dimers and trimers of the cited polyfunctional isocyanates can also be used. Such polyisocyanates have terminal free isocyanate groups and contain one or more uretdione and/or isocyanurate rings. Methods of preparing different kinds of such trimers and uretdiones are described, inter alia, in U.S. Pat. Nos. 3,494,888, 3,108,100 and 2,977,370.

The present invention also relates to a process for the preparation of the novel adducts, which comprises reacting an epoxy resin (a) having a OH value of 0.02–1.5 equivalents/kg and a di- or polyisocyanate (b), excluding moisture and essentially without a catalyst, and, in a further optional step, reacting the product so obtained with an inhibitor (c).

The latent catalyst (d) for curing the novel adducts is suitably any compound conventionally used as hardener for EP/IC resin systems. Exemplary of suitable hardeners are tertiary amines or imidazoles, preferably addition complexes of boron trihalides with tertiary amines and imidazoles or onium salts of tertiary amines and imidazoles, as described in EP-A 130 454 and EP-A 129 799, or the tertiary or quaternary ammonium salts of alkylating or acid esters of organic phosphonic acids or phosphoric acid disclosed in DE-A 3 600 764, or the specific cyanoacetamides disclosed in EP-A 319 473.

Particularly suitable hardeners are sulfonium salts of formulae I to IV

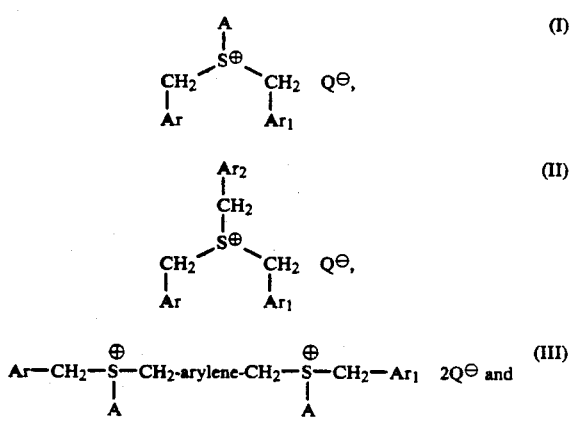

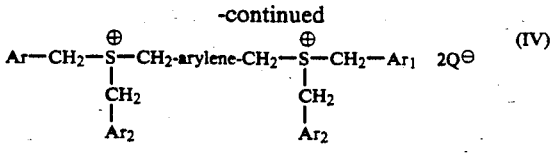

wherein A is $C_1$–$C_{12}$alkyl, $C_3$–$C_8$cycloalkyl, $C_4$–$C_{10}$cycloalkylalkyl, unsubstituted phenyl or phenyl which is substituted by one or more identical or different members selected from the group consisting of $C_1$–$C_8$alkyl, $C_1$–$C_4$alkoxy, halogen, nitro, phenyl, phenoxy, alkoxycarbonyl containing 1 to 4 carbon atoms in the alkoxy moiety and acyl of 1 to 12 carbon atoms, Ar, Ar$_1$ and Ar$_2$ are each independently of one another unsubstituted phenyl or phenyl which is substituted by one or more identical or different members selected from the group consisting of $C_1$–$C_8$alkyl, $C_1$–$C_4$alkoxy, halogen, nitro, phenyl, phenoxy, alkoxycarbonyl containing 1 to 4 carbon atoms in the alkoxy moiety and acyl of 1 to 12 carbon atoms, or unsubstituted naphthyl or naphthyl which is substituted by one or more identical or different members selected from the group consisting of $C_1$–$C_8$alkyl, $C_1$–$C_4$alkoxy, halogen, nitro, phenyl, phenoxy, alkoxycarbonyl containing 1 to 4 carbon atoms in the alkoxy moiety and acyl of 1 to 12 carbon atoms, arylene is unsubstituted phenylene or phenylene which is substituted by one or more identical or different members selected from the group consisting of $C_1$–$C_8$alkyl, $C_1$–$C_4$alkoxy, halogen, nitro, phenyl, phenoxy, alkoxycarbonyl containing 1 to 4 carbon atoms in the alkoxy moiety and acyl of 1 to 12 carbon atoms, or unsubstituted naphthylene or naphthylene which is substituted by one or more identical or different members selected from the group consisting of $C_1$–$C_8$alkyl, $C_1$–$C_4$alkoxy, halogen, nitro, phenyl, phenoxy, alkoxycarbonyl containing 1 to 4 carbon atoms in the alkoxy moiety and acyl of 1 to 12 carbon atoms, and $Q^\ominus$ is $SbF_6^\ominus$, $AsF_6^\ominus$ or $SbF_5OH^\ominus$.

A in formulae I and III is preferably $C_1$–$C_{12}$alkyl, Ar, Ar$_1$ and Ar$_2$ in formulae I to IV are each independently of one another unsubstituted phenyl or phenyl which is substituted by one or more identical or different members selected from the group consisting of $C_1$–$C_8$alkyl, $C_1$–$C_4$alkoxy, Cl and Br, and $Q^\ominus$ is $SbF_6^\ominus$ or $SbF_5OH^\ominus$, for example dibenzylethylsulfonium hexafluoroantimonate.

The novel mixtures preferably contain as component (c) a sulfonium salt of formula I or III in which A, Ar, Ar$_1$, Ar$_2$ and $Q^\ominus$ are as defined above.

Particularly preferred sulfonium salts are those of formula II, wherein Ar, Ar$_1$ and Ar$_2$ are each independently of one another unsubstituted phenyl or phenyl which is substituted by $C_1$–$C_8$alkyl, $C_1$–$C_4$alkoxy, Cl or Br, and $Q^\ominus$ is $SbF_6^\ominus$ or $SbF_5OH^\ominus$, most preferably tribenzylsulfonium hexafluoroantimonate or tris(p-methylbenzyl)sulfonium hexafluoroantimonate.

A in formulae I and III as $C_1$–$C_{12}$alkyl may be straight-chain or branched, and is typically methyl, ethyl, isopropyl, n-butyl, sec-butyl, tert-butyl, n-octyl or n-dodecyl.

Suitable cycloalkyl groups are typically cyclopropyl, cyclopentyl, cyclohexyl and cyclooctyl.

Cycloalkylalkyl may be cyclohexylmethyl and cyclohexylethyl.

A, Ar, Ar$_1$ and Ar$_2$ in formulae I to IV as substituted phenyl or naphthyl may carry identical or different substituents and are typically p-tolyl, xylyl, ethylphenyl, methoxyphenyl, ethoxyphenyl, p-chlorophenyl, 2,4-, 3,4- or 2,6-dichlorophenyl, bromophenyl, acetylphenyl, trimethylphenyl, methylnapthyl, methoxynaphthyl, ethoxynaphthyl, chloronaphthyl, bromonaphthyl and biphenyl.

Arylene in formulae III and IV as substituted phenylene or naphthylene may be methylphenylene, ethylphenylene, methoxyphenylene, ethoxyphenylene, chlorophenylene, dichlorophenylene, bromophenylene, acetylphenylene, trimethylphenylene, methylnapthylene, methoxynaphthylene, ethoxynaphthylene, chloronaphthylene or bromonaphthylene. Preferably arylene is unsubstituted phenylene or naphthylene.

The sulfonium salts of formulae I and II present in the mixtures of this invention can be prepared by one of the methods described in Houben-Weyl, Methoden der organischen Chemie, Vol. IX, page 171 et seq. (1955), and in Supplementary Volume E 11, page 405 et seq. (1985), for example by reacting a sulfide of formula VI

Ar—CH$_2$—S—CH$_2$—Ar$_1$     (VI), wherein Ar and Ar$_1$ are as defined for formula I or II above, either (a) with molar amounts of an oxonium salt of formula VII

wherein A is as defined for formula I and Z$^\ominus$ is Q$^\ominus$, SbCl$_6^\ominus$, BF$_4^\ominus$ or PF$_6^-$, to compounds of formula I or formula Ia

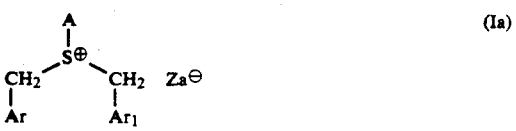

wherein Za$^\ominus$ is SbCl$_6^\ominus$, BF$_4^\ominus$ or PF$_6^\ominus$, and subsequently reacting the compounds of formula Ia by anion exchange with an alkali metal salt or a quaternary ammonium salt of formula VIII

Y$^\oplus$Q$^\ominus$     (VIII), wherein Y is an alkali metal cation or N(R$_4$)$^\oplus$, where R is hydrogen or C$_1$-C$_4$alkyl, and Q$^\ominus$ is as defined for formula I above, to a compound of formula I, or (b) in the presence of a strong acid, with at least a molar amount of an alcohol of formula IX Ar$_2$—CH$_2$—OH     (IX), wherein Ar$_2$ is as defined for formula II above, to a sulfonium salt of said acid of formula IIa

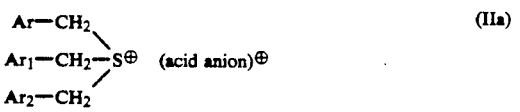

and subsequently reacting the sulfonium salt of formula IIa with an alkali metal salt or a quaternary ammonium salt of formula VIII to a compound of formula II.

In similar manner, the compounds of formulae III and IV can be prepared by, for example, reacting 1 mol of a compound of formula X Ar—CH$_2$—S—CH$_2$-arylene-CH$_2$—S—CH$_2$—Ar$_1$     (X), wherein Ar and Ar$_1$ are as defined for formula III or IV above, either (a) with 2 mol of an oxonium salt of formula VI to compounds of formula III or formula IIIa

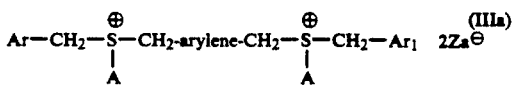

wherein Za$^\ominus$ is SbCl$_6^\ominus$, BF$_4^\ominus$ or PF$_6^\ominus$, and subsequently reacting the compound of IIIa by anion exchange with an alkali metal salt or a quaternary ammonium salt of formula VIII to a compound of formula III, or (b) in the presence of a strong acid, with 2 mol of an alcohol of formula VIII to a disulfonium salt of said acid of formula IVa

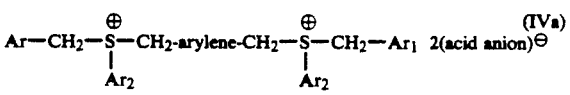

and subsequently reacting the disulfonium salt of formula IVa with an alkali metal salt or a quaternary ammonium salt of formula VIII to a compound of formula IV.

The compounds of formulae VI, VII, VIII, IX and X are known compounds, some of which are commercially available.

For example, sulfides of formula VI are described in Houben-Weyl, Vol. 9, page 93 (1955), or Vol. E 11, page 158 (1985) or are commercially available from Fluka and Aldrich.

Oxonium salts of formel VII are known, inter alia, from Houben-Weyl, Vol. 6/3, page 328 (1965), or from U.S. Pat. No. 3,585,227.

Alkali metal salts or quaternary ammonium salts of formula VIII, for example NaSbF$_6$, NaAsF$_6$ or NH$_6$AsF$_6$, are available from Morton Thiokol. Alcohols of formula IX, such as benzyl alcohol or chlorinated benzyl alcohols, are also commercially available.

Compounds of formula X can be prepared in known manner typically by reacting 1 mol of an unsubstituted or substituted α,α'-dihalomethylarylene of formula XI Hal—CH$_2$—arylene-CH$_2$—Hal     (XI)

in the presence of aqueous alkali, with 2 mol of an unsubstituted or substituted mercaptan of formula XII Ar—CH$_2$—SH or Ar$_1$—CH$_2$—SH     (XII)

to compounds of formula X.

Compounds of formula I or III, wherein A is the radical of formula XIII

wherein R' and R" are each independently of the other a hydrogen atom or, together with the ethylene radical, are alkyl containing up to 12 carbon atoms or cycloalkyl containing up to 8 carbon atoms, can further be prepared by reacting a sulfide of formula VI, in the presence of a strong acid, with at least a molar amount of an olefin of formula XIV

to a sulfonium salt of formula XV or XVI

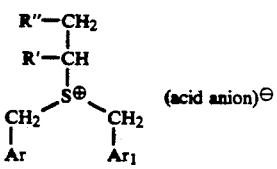

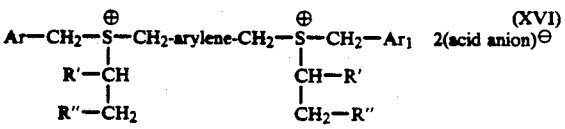

and subsequently reacting the sulfonium salt of formula XV or XVI with an alkali metal salt or quaternary ammonium salt of formula VIII to a compound of formula I or III, wherein A is the radical of formula XIII.

The olefins of formula XIV are typically ethylene, propylene, 1-butene, 2-butene, isobutylene, 1-pentene, 2-pentene, cyclobutene, cyclopentene or cyclohexene, and the strong acids may be $H_2SO_4$, $HPF_6$, $HBF_4$, $HClO_4$ or $CF_3SO_3H$.

In the heat curable mixtures of this invention, the latent catalyst (d) is conveniently used in amounts of 0.01 to 10% by weight, preferably of 0.1 to 5% by weight, most preferably of 0.1 to 2.5% by weight, based on the amount of adduct.

The heat curable mixtures of this invention may contain further known modifiers conventionally used in the art of polymerisable materials. Typical examples of such modifiers are pigments, dyes, fillers and reinforcing agents, flame retardants, antistatic agents, adhesion promoters, flow control agents, antioxidants and light stabilisers. Suitable fillers are mineral and fibrous fillers such as quartz powder, fused silica, alumina, glass powder, mica, kaolin, dolomite, graphite, carbon black, as well as carbon fibres and textile fibres. Preferred fillers are quartz powder, fused silica, alumina or dolomite.

The heat curable mixtures can be used quite generally for making cured products and can be used in a formulation adapted to suit each particular utility, typically as coating compounds, paints and varnishes, compression moulding materials, dipping resins, casting resins, impregnating resins, laminating resins, one component or two component adhesives or matrix resins.

Temperatures in the range from 60° to 250° C., preferably from 60° to 220° C., most preferably 80° to 200° C., are normally used for curing the mixtures of this invention.

The products obtained from the novel mixtures by heat curing have excellent thermal, mechanical and electrical properties.

The cure is normally effected while simultaneously shaping to moulded articles, impregnations, coatings or bonds.

The invention is illustrated by the following Examples.

EXAMPLES 1-6

Preparation of the adducts (cf. Table 1)

Example 1: (NCO:EP in the molar ratio 0.9:1.0)

200 parts by weight of a bisphenol A epoxy resin having an epoxy value of 5.2 eq/kg and an OH value of 216 eq/kg are mixed with 89 parts by weight of a prepolymerised diisocyanatodiphenylmethane resin having a NCO content of 26.1% and a viscosity of 140 mPa.s at 25° C. (ISONATE ® M340, ex Dow) and 89 parts by weight of a diisocyanatodiphenylmethane having a NCO content of 23% and a viscosity of 15 mPa.s at 25° C. (BAYMIDUR ® KL-3-5002, ex Bayer), and the mixture is heated to 100° C., excluding moisture. During the 10 hour reaction time, with stirring, the exothermic reaction is so weak that the reaction temperature of 100° C. in the mixture is not exceeded. After 10 hours the original viscosity of 670 mPa.s (25° C.) rises to 1783 mPa.s (25° C.), whereas the NCO content falls from 11.6% to 10.7%. The epoxy value of the reaction mixture remains unchanged at 2.75 eq/kg. To the reaction mixture are added 3.78 parts by weight of dipentaerythritol hexacrylate (ARONIX ® M-400, ex Toagosei Chemical Ind., Japan) at 100° C., and the mixture is reacted at this temperature. The reaction is complete after 60 minutes. A pale yellow epoxy-isocyanate adduct IV is obtained from the cooled reaction mixture. It has the following properties:

viscosity at 25° C.: 2250 mPa·s;
epoxy value: 2.75 eq/kg;
NCO content: 10.5%.

In accordance with the general procedure of Example 1, adducts having other NCO:EP molar ratios are prepared using the same reactants:

Example 2: (NCO:EP in the molar ratio 6.0:1.0)

50 parts by weight of bisphenol A epoxy resin
164 parts by weight of isocyanate resin (NCO content 26.1%)
164 parts by weight of isocyanate resin (NCO content 23.0%)
3.8 parts by weight of dipentaerythritol hexacrylate.

Adduct I

Viscosity at 25° C.: 285 mPa·s;
Epoxy value: 0.69 eq/kg;
NCO content: 20.4%.

Example 3: (NCO:EP in the molar ratio 2.8:1.0)

100 parts by weight of bisphenol A epoxy resin
139 parts by weight of isocyanate resin (NCO content 26.1%)
139 parts by weight of isocyanate resin (NCO content 23.0%)
3.8 parts by weight of dipentaerythritol hexacrylate.

Adduct II

Viscosity at 25° C.: 580 mPa·s;
Epoxy value: 1.38 eq/kg;

NCO content: 17.2%.

Example 4: (NCO:EP in the molar ratio 1.53:1.0)

150 parts by weight of bisphenol A epoxy resin
114 parts by weight of isocyanate resin (NCO content 26.1%)
114 parts by weight of isocyanate resin (NCO content 23.0%)
3.8 parts by weight of dipentaerythritol hexacrylate.

Adduct III

Viscosity at 25° C: 1076 mPa·s;
Epoxy value: 2.1 eq/kg;
NCO content: 13.9%.

Example 5: (NCO:EP in the molar ratio 0.52:1.0)

250 parts by weight of bisphenol A epoxy resin
64 parts by weight of isocyanate resin (NCO content 26.1%)
64 parts by weight of isocyanate resin (NCO content 23.0%)
3.8 parts by weight of dipentaerythritol hexacrylate.

Adduct V

Viscosity at 25° C: 2860 mPa·s;
Epoxy value: 3.4 eq/kg;
NCO content: 7.4%.

Example 6: (NCO:EP in the molar ratio 0.26:1.0)

300 parts by weight of bisphenol A epoxy resin
39 parts by weight of isocyanate resin (NCO content 26.1%)
39 parts by weight of isocyanate resin (NCO content 23.0%)
3.8 parts by weight of dipentaerythritol hexacrylate.

Adduct VI

Viscosity at 25° C: 3960 mPa·s;
Epoxy value: 4.1 eq/kg;
NCO content: 4.1%.

TABLE 1

| Preparation of the adducts I to VI | | | | | | |
|---|---|---|---|---|---|---|
| | Example | | | | | |
| | 2 | 3 | 4 | 1 | 5 | 6 |
| | Adduct | | | | | |
| | I | II | III | IV | V | VI |
| bisphenol A epoxy resin (parts by weight) | 50 | 100 | 150 | 200 | 250 | 300 |
| isocyanate resin (NCO content 26.1%) (parts by weight) | 164 | 139 | 114 | 89 | 64 | 39 |
| isocyanate resin (NCO content 23.0%) (parts by weight) | 164 | 139 | 114 | 89 | 64 | 39 |
| NCO:EP molar ratio | 6:1 | 2.8:1 | 1.53:1 | 0.9:1 | 0.52:1 | 0.26:1 |

EXAMPLE 7

Preparation of moulded articles for test purposes (cf. Table 2)

Preparation of the Reactive Casting Resin 378 parts by weight of each of the adducts I to VI prepared according to Examples 1 to 6 are charged to a stirred reactor and heated to 50° C. Then 686 parts by weight of quartz powder of Type W12, ex Quartzwerke Frechen (FRG), are added and stirred until a homogeneous mixture is obtained over 10 minutes. To this premix, which remains at c. 45° C. from the heat of friction of stirring, are added 2 parts by weight of dimethylbenzylamine-boron trichloride complex as catalyst. The reactive casting resin mixture is degassed under vacuum at 1-2 mbar for subsequent pouring into moulds preheated to 120° C. The mixture gels at 120° C. over c. 15 minutes. The products are removed from the mould after 2 hours and postcured for 4 hours at 150° C. and for 16 hours at 200° C.

The mouldings have the properties listed in Table 2.

TABLE 2

| Properties of the mouldings | | | | | | |
|---|---|---|---|---|---|---|
| Example | 7.2 | 7.3 | 7.4 | 7.1 | 7.5 | 7.6 |
| Adduct | I | II | III | IV | V | VI |
| NCO:EP ratio | 6:1 | 2.8:1 | 1.53:1 | 0.9:1 | 0.52:1 | 0.26:1 |
| glass transition temperature (°C.) (TMA) Mettler 4000 | 250 | 247 | 212 | 193 | 160 | 136 |
| oxygen index (%) ASTM D2863 | 43.7 | 37.0 | 37.7 | 39.3 | 46.2 | 43.1 |
| combustibility UL 94 step | 94 V-O | 94 V-O | 94 HB | 94 HB | 94 HB | 94 HB |
| gelation time at 140° C. gelling machine | 6'20" | 5'20" | 5' | 4'50" | 5'20" | 7'11" |
| flexural modulus from flexural test ISO 178 (N/mm²) | 11760 | 11546 | 12094 | 11807 | 11657 | 10810 |
| flexural strength ISO 178 (N/mm²) | 126.9 | 134.5 | 139 | 151.7 | 154.6 | 159 |
| edge fibre elongation (%) ISO 178 | 1.14 | 1.25 | 1.22 | 1.39 | 1.47 | 1.75 |
| Martens (°C.) DIN 16945 | 263 | 241 | 221 | 188 | 167 | 153 |
| tracking resistance KA method (step) DIN 53480 | KA 1 | KA 1 | KA 1 | KA 1 | KA 1 | KA 1 |

EXAMPLE 8

Preparation of mouldings for test purposes (cf. Table 3)

Preparation of the Reactive Casting Resin

The procedure described in Example 7 is repeated, but using 2.5 parts by weight of dibenzylphenylsulfonium hexafluoroantimonate as catalyst.

TABLE 3

| Properties of the mouldings | | | | | | |
|---|---|---|---|---|---|---|
| Example | 8.2 | 8.3 | 8.4 | 8.1 | 8.5 | 8.6 |
| Adduct | I | II | III | IV | V | VI |
| NCO:EP ratio | 6:1 | 2.8:1 | 1.53:1 | 0.9:1 | 0.52:1 | 0.26:1 |
| glass transition temperature (°C.) (TMA) Mettler 4000 | 292 | 258 | 227 | 205 | 185 | 149 |
| flexural modulus from flexural test ISO 178 (N/mm$^2$) | 12800 | 12600 | 12100 | 11700 | 11500 | 11200 |
| flexural strength ISO 178 (N/mm$^2$) | 112 | 126 | 131 | 137 | 148 | 156 |
| edge fibre elongation (%) ISO 178 | 1.1 | 1.2 | 1.2 | 1.25 | 1.3 | 1.4 |

EXAMPLES 9-12

The procedure of Example 7 is repeated, but using 610 instead of 686 parts by weight of quartz powder and, in Examples 10 and 12, replacing dimethylbenzylamine-boron trichloride complex (as latent catalyst) with a corresponding amount of the non-latent catalyst, dibenzylamine (viz. 0.2 parts by weight), to obtain with adducts II and IV of Examples 3 and 1 mouldings having comparably good properties and the properties listed in the following table:

| Example | 9 | 10 | 11 | 12 |
|---|---|---|---|---|
| Adduct | IV | IV | II | II |
| NCO:EP ratio | 0.9:1 | 0.9:1 | 2.8:1 | 2.8:1 |
| catalyst | as Ex. 7 | C | as Ex. 7 | C |
| service life | 48 h | 30–110 m | 48 h | 30–110 m |
| gelation time | 5 m | 4–9 m | 6 m | 4–9 m |
| glass trans. temp. °C. | 240 | 220 | 250 | 230 |
| flexural modulus from flex. test ISO 178 (N/mm$^2$) | 11800 | 11200 | 12200 | 12000 |
| flexural strength ISO 178 (N/mm$^2$) | 150 | 155 | 135 | 140 |

C = catalyst dibenzylamine; m = minutes.

What is claimed is:

1. An adduct obtained by reacting (a) an epoxy resin having a OH value of 0.02–1.5 equivalents/kg and (b) a di- or polyisocyanate, said reaction being carried out with exclusion of moisture and essentially without a catalyst, wherein the amounts of the components (a) and (b) are so chosen that 0.1–40 isocyanate groups of the di- or polyisocyanate (b) are present per epoxy group of the epoxy resin (a).

2. An adduct according to claim 1, wherein the amounts of the components (a) and (b) are so chosen that 0.2–10 isocyanate groups of the di-or polyisocyanate (b) are present per epoxy group of the epoxy resin (a).

3. An adduct according to claim 1, obtained by carrying out the reaction at 50°–150° C. for 5–15 hours.

4. An adduct according to claim 3, obtained by carrying out the reaction at 80°–120° C. for 8–12 hours.

5. An adduct according to claim 1, wherein the epoxy resin (a) is an aliphatic, cycloaliphatic or aromatic epoxy resin.

6. An adduct according to claim 5, wherein the epoxy resin (a) is an aromatic epoxy resin.

7. An adduct according to claim 1, wherein the isocyanate (b) is an aliphatic, cycloaliphatic or aromatic isocyanate.

8. An adduct according to claim 7, wherein the isocyanate (b) is a mixture of 4,4'- and 2,4'-diisocyanatodiphenylmethane isomers, or a mixture of liquid polyisocyanates with high molecular weight polyisocyanates or carbodiimide polyisocyanates.

9. A storage-stable adduct obtainable by reacting an adduct as claimed in claim 1 with an inhibitor (c).

10. An adduct according to claim 9, wherein the inhibitor (c) is a cinnamate, methacrylate or, preferably, an acrylate.

11. An adduct according to claim 10, wherein the inhibitor (c) is dipentaerythritol hexacrylate or a mixture of dipentaerythritol hexacrylate and dipentaerythritol monohydroxypentacrylate.

12. A process for the preparation of an adduct as claimed in claim 1, which comprises reacting (a) an epoxy resin having a OH value of 0.02–1.5 equivalents/kg and (b) a di- or polyisocyanate, said reaction being carried out with exclusion of moisture and essentially without a catalyst and, in an additional optional step, reacting the product so obtained with an inhibitor (c).

13. A curable mixture comprising an adduct as claimed in claim 1 and (d) a latent catalyst.

14. Cross-linked products obtainable by thermal cure of the mixture as claimed in claim 13.

15. An adduct according to claim 6, wherein the epoxy resin (a) is an epoxy resin derived from bisphenol A.

* * * * *